Dec. 9, 1958  K. T. MILLER  2,863,158
WIRE CUTTING AND STRIPPING TOOL
Filed Dec. 16, 1957
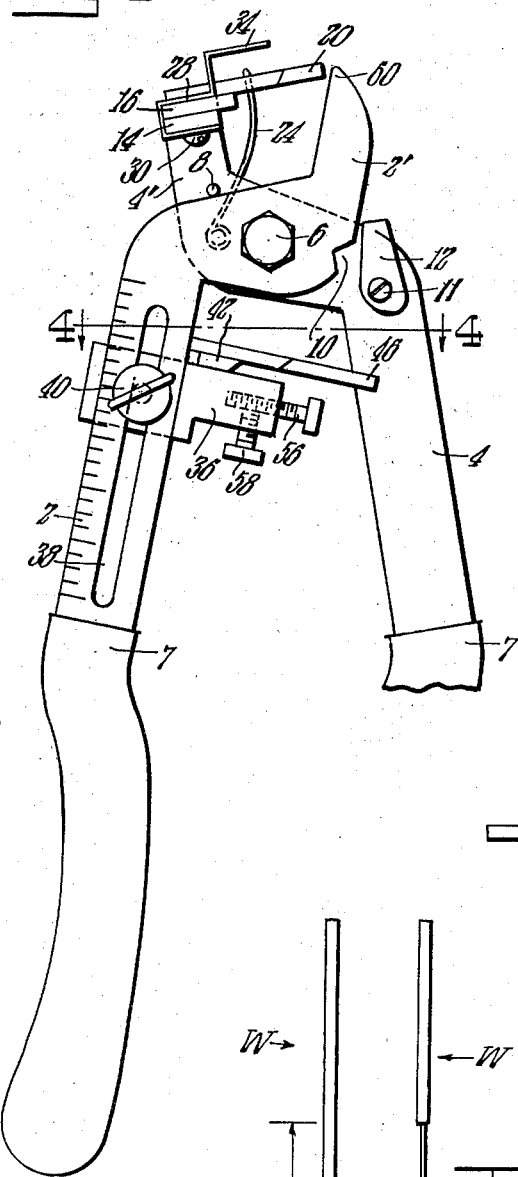
INVENTOR.
Kenneth T. Miller.
BY
Ross Ross Attys.

2,863,158
WIRE CUTTING AND STRIPPING TOOL

Kenneth T. Miller, Longmeadow, Mass.

Application December 16, 1957, Serial No. 702,978

3 Claims. (Cl. 7—5.3)

This invention relates to wire working tools and is directed more particularly to tools for simultaneously cutting off the end of an insulated wire and removing insulation from a predetermined length of the wire.

It is often desired to provide predetermined lengths of bare wire and to cut off the end of the wire. It is required to provide a clean cut at the end of the wire without burrs, and to remove insulation without nicking or otherwise marring the wire.

According to novel features of the invention, a tool is provided which has cutting off means for cutting off the end of an insulated wire, and other severing means to sever the insulation to facilitate stripping of the insulation from the wire so as to leave a bare portion of the wire.

The cutting means is adjustable to and from the severing means whereby it is possible to provide a length of bare wire of predetermined length.

The tool is constructed and arranged so that it is possible in one operation to cut off the end of insulated wire to provide a clean smooth cut at the end of the wire, and at the same time, to sever the insulation for stripping it from the end portion of the wire.

Various changes and modifications may be made in the form of the tool of the invention without departing from the spirit and shape thereof.

In the drawings:

Fig. 1 is a front elevational view of the tool of the invention;

Fig. 2 is a top plan view of the tool shown in Fig. 1;

Fig. 3 is a side elevational view of the uppermost portion of the tool shown in Fig. 1;

Fig. 4 is a sectional plan view of the line 4—4 of Fig. 1;

Fig. 5 is a plan view of a length of wire before cutting off the end thereof and stripping insulation from the end portion of the wire; and Fig. 6 is a plan view of the length of wire after the end thereof has been cut off, and insulation slipped therefrom.

Referring now to the drawings more in detail, the novel features of the invention will be described.

A pair of handles 2 and 4 are provided which have upper jaw portions 2' and 4' respectively. The handles are pivoted at 6 for swinging movements between the open position shown in Fig. 1, and a closed position thereof. The lower portions of the handles are sheathed, as at 7, in insulating material, or the like.

A stop pin 8 limits movement of the handles to the open position, shown in Fig. 1.

Handle 2 is provided with a notch 10, and a stop 12 is pivoted at 11 to the handle 4 and has an upper end, as shown, that is receivable in the notch 10 to releasably hold the handles in their closed position.

The upper end of jaw 4' has a forwardly extending portion 14 to which is secured a stripping plate 16 having a notch 18 provided with sharpened edges. A movable cutting plate 20 is pivoted at 22 to the plate 16 for swinging relative to the plate 16.

A spring 24 has a lower end secured to an upper portion of the handle 4, and an upper end of said spring is looped through an opening 26 of the blade 20. Said spring 24 is formed to bias said blade 20 counterclockwise to its open position, as shown.

A stop 28 overlies the extension 14 and plate 16 and is secured thereto by screw 30. A lateral guide portion 34 of the member 28, as in Fig. 2, is disposed over the notch 18 of plate 16 to serve as a guide to position a length of insulated wire in said notch, see Fig. 2.

A slide member 36 is adjustable along the handle 2 which is provided with a longitudinal slot 38. A screw 40 extending through the slot 38 threadedly engages member 36 and is adapted to hold the slide in adjusted positions along the handle.

A stationary cutting blade 42 is secured to the slide member 36 by a screw 44, or the like, and is provided with an inner cutting edge 42'. A second cutting blade 46 is pivoted at 48 to the blade 42 and member 36, and has a sharpened inner edge, as shown, for cooperating with the blade to cut off the end of a length of covered wire.

A spring 50 looped upon itself intermediate its ends has one end secured to member 36, as by a screw 52. The other end of said spring 50 extends through a hole 54 of blade 46 and is adapted to move the said blade 46 counterclockwise to the open position shown.

A stop screw 56 is in threaded engagement with member 36 and is adjustable in and out relative thereto. As the handles are closed, the handle 4 abuts the screw to limit the closed position thereof, and establishes, according to the adjustment of said screw, the relation of the inner edge of upper plate 20 and the notch 18. This is so that, as the handles are closed, the insulation of a length of wire will be cut through to the wire without cutting or nicking the wire therewithin. A binding screw 58 is in threaded engagement with the member 36 and is adapted to engage and hold the screw 56 in adjusted position.

A length of insulated wire is represented by W in Figs. 5 and 6. It will be assumed that it is desired to cut off the end of the wire at C and to bare the wire W by removing the insulation throughout a length represented by L.

The slide 36 is secured to handle 2 in adjusted position so that the distance between the coacting edges of the blades 42 and 46 are a distance from the operating edges of the coacting plates 16 and 20 equal to the length L.

In operation of the tool, a length of insulated wire is placed in the tool so that its lower end portion extends between and below the lower blades 42 and 46. Its upper portion is disposed in the notch 18 and against a side of the lateral guide portion 34 of said stop for the action of the cutting plate 20.

The handles are closed, and the lower end of the wire is cut off by the blades 42 and 46. At the same time, the insulation of the wire, in the notch 18 and against the guide 34, is cut through to the wire by the cutting plate 20 and notch.

In the closed position of the handles, the length of wire is drawn upwardly so that the insulation is stripped from the wire by the cutting plate 20 and notch 18.

In closing the handles, the handle 4 acts on blade 46 to swing it inwardly against the action of spring 50, and an uppermost portion 60 of jaw 2' of the handle 2 acts on plate 20 to swing it inwardly against the action of spring 24.

It will be observed that the tool of the invention is constructed and arranged for cutting off the end of insulated wire, and at the same time, severing the insulation down to the wire so that the length of wire may be drawn through the notch 18 and adjacent blade to strip the insulation and bare the wire, as at W'.

The length of wire to be bare may be varied, as desired, by adjusting the member 36. The stop 56 may be adjusted for the coaction of plate 20 and notch 18 so as to sever the insulation down to the wire without nicking or injuring the wire.

It is desired to claim and secure by Letters Patent of the United States the following:

1. A tool for cutting off the end of insulated wire and stripping insulation from an end portion of the wire, said tool comprising a pair of handles pivoted for movements between open and closed positions and having upper jaw portions, a pair of relatively movable upper insulation severing plates carried by the jaw portion of one handle, a pair of lower relatively movable cut-off blades, means mounting said cut-off blades on one of said handles, said upper plates and said blades being actuated as said handles are moved to closed position.

2. A tool set forth in claim 1 wherein said plates include a stationary plate and a plate pivoted thereto, and said stationary plate being provided with a sharpened notch.

3. A tool set forth in claim 1 wherein said mounting means includes a member adjustable along said one handle, and means for releasably holding said member in adjusted position on said handle.

No references cited.